Figure 1:
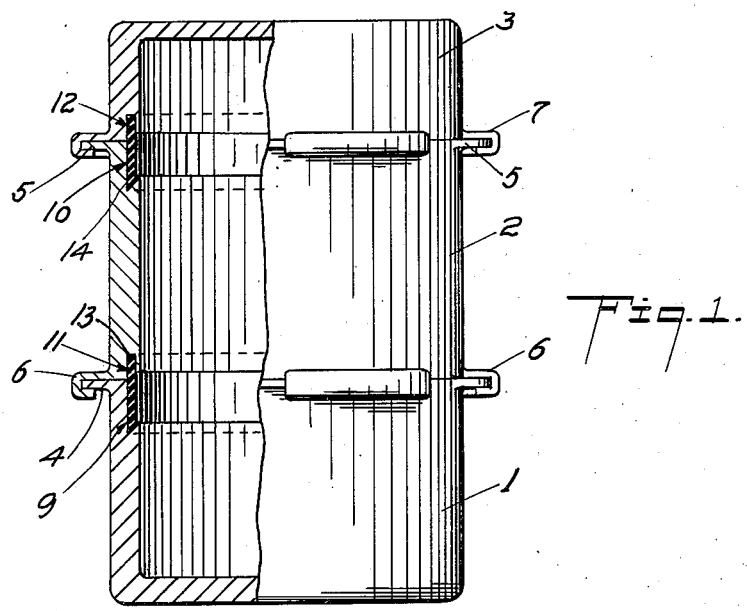

June 7, 1949.    T. R. RHODES ET AL    2,472,620
PRESSURE COOKER
Filed June 21, 1946

INVENTORS:
T. R. Rhodes &
E. R. Hunt
BY OO Martin
ATTORNEY.

Patented June 7, 1949

2,472,620

UNITED STATES PATENT OFFICE 2,472,620

PRESSURE COOKER

Thornton R. Rhodes, South Gate, and Ernest R. Hunt, Los Angeles, Calif.

Application June 21, 1946, Serial No. 678,242

2 Claims. (Cl. 285—175)

1

The present invention has relation to pressure cookers and has particular reference to improved means for hermetically sealing the component parts of such cookers.

It is the object of our invention to provide a pressure cooker which is made in sections and fitted with means for locking the various sections together. Another object is to provide, within the joints of the abutting sections, sealing means which, when the cooker is assembled, are loosely placed within the joints thereof and impelled by pressure which is generated within the cooker when the latter is placed upon the fire tightly to seal these joints. Another object is to provide a pressure cooker of the type referred to which may be turned upside down and which is equally effective in operation whether standing on one end or the other. These and other objects of the invention will be better understood from reference to the following detailed description, and drawings are hereto annexed in which a preferred form of the invention is illustrated.

Figure 2:
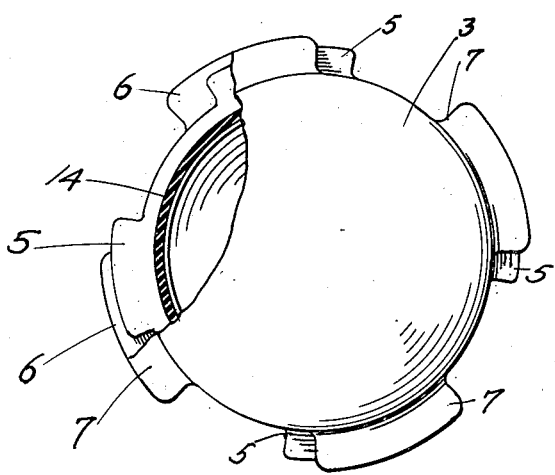

In the drawings:

Fig. 1 is a side elevational view of the device embodying the invention, and with parts thereof broken away for the sake of clearness; and Fig. 2 is a substantially corresponding plan view of the device, also with a portion of the casing thereof broken away.

As illustrated in the drawings, the cooker consists of a base portion 1, an intermediate section 2, and a top portion or cover 3, but it is to be understood that more intermediate sections may be added if preferred, or the intermediate section 2 may be entirely omitted where a cooker of smaller capacity is required. The base section and the intermediate section are, along the top edges thereof, made with segmental flanges 4, 5 of a size to fit within channeled segmental flanges at the bottom edges of the intermediate section 2 and the cover 3. All of these flanges should be exactly alike in order that all parts of the cooker may be interchangeable and so as to make it possible to increase or decrease the number of intermediate sections or entirely to leave out such sections, all as above referred to.

At the top edges of the base section and the intermediate section are made annular recesses 9, 10, the bottoms of which are V-shaped, substantially as indicated, and annular grooves 11, 12 are sunk into the bottom edges of the intermediate section and the top section, respectively. The outer walls of these grooves register with the

2 walls of the recesses 9, 10 when the parts are assembled, as indicated in Fig. 1. Annular sealing members 13, 14 are shown seated in the grooves 11, 12 of the intermediate and the top sections and they extend downward to occupy the spaces within the recesses 9, 10 when the sections are mounted together. But it is important to note that these sealing members, which for convenience may be held in position within the grooves 11, 12, extend freely into the said recesses and are not in any way under pressure therein until such a time that steam pressure within the cooker forces the members against the outer walls of the recesses and the said grooves. This is an important departure from any pressure cooker sealing means that has come to our attention.

The locking of the parts of the cooker together by insertion of the channeled flanges 6, 7 between the annular flanges 4, 5 and then relatively rotating the parts to cause the latter flanges to enter the former is conventional, but it is important to note that it is not required to exert any great effort in order to lock the parts of the cooker together but that the parts thereof may be readily rotated relative to each other and that only pressure generated within the cooker is relied upon to seal the joints between the sections. It is also readily seen that it becomes immaterial whether the cooker is set on the fire on one end or the other, because the pressure within the cooker relied upon to seal the joints thereof remains the same in either position thereof. It should be clear also that while in the drawings this sealing member is shown lodged in the grooves sunk into the bottom edges of the intermediate and top sections, this arrangement may as well be reversed so as to lodge the sealing element within grooves sunk into the top edges of the base and intermediate sections. We wish it understood, also, that further modifications may be embodied within the scope of the claims hereto appended.

It was above stated that the sealing members do not require to be and are not under sealing pressure within the joints of the cooker until forced outward by internal pressure to seal the joints. It is, however, to be noted that the sealing members should be made to fit snugly enough to prevent seepage of liquid contents before heat is applied to the cooker.

We claim:

1. A pressure cooker comprising a cylindrical casing divided into axially interfitting sections, provided with means for interlocking the sections, each section being made at one edge thereof with an internal annular recess having a V-shaped bottom, the edge of each abutting section being made with an annular groove in continued alignment with said recess, and an annular resilient sealing member seatable in each groove and freely extending to the bottom of each recess, the outer edge of each member being shaped to fit within the V-shaped recess bottom.

2. A pressure cooker comprising a cover section, a bottom section and an intermediate section; said sections combining to form a cylindrical casing, the cover section and the intermediate section each having a segmental channeled flange horizontally projecting from the bottom edge thereof and an annular recess sunk into the bottom surface thereof, the intermediate section and the bottom section each having a segmental fin-shaped flange horizontally projecting from the upper edge thereof of a thickness to fit snugly within the channeled flange of the adjoining section and an annular groove in continued alignment with the adjoining recess, the bottoms of said grooves being V-shaped, and annular resilient sealing member seatable in said recesses and freely extending to the bottoms of said grooves, the bottom edges of said members being shaped to fit the bottoms of said grooves, the members being vertically compresed when the sections are assembled to form tight joints at the top and bottom edges thereof.

THORNTON R. RHODES.
ERNEST R. HUNT.

REFERENCES CITED

The following references are of record in the file of this patent:

UNITED STATES PATENTS

| Number | Name | Date |
|---|---|---|
| 692,795 | Moyle | Feb. 4, 1902 |
| 1,603,903 | Church | Oct. 19, 1926 |
| 2,283,975 | Dillan | May 26, 1942 |

FOREIGN PATENTS

| Number | Country | Date |
|---|---|---|
| 546,242 | Germany | Feb. 25, 1932 |